United States Patent
Uhlig et al.

[15] 3,640,723
[45] Feb. 8, 1972

[54] ENZYMATIC TREATMENT OF SOYA MEAL

[72] Inventors: Helmut Uhlig, Rossdorf Bei Darmstadt; Ekkehard Grampp, Ober-Ramstadt, both of Germany

[73] Assignee: Rohm Gesellschaft mit beschrankter Haftung, Darmstadt, Germany

[22] Filed: July 8, 1969

[21] Appl. No.: 840,065

[30] Foreign Application Priority Data

July 26, 1968  Germany......................P 17 92 142.5

[52] U.S. Cl..................................................99/9, 99/98
[51] Int. Cl. ........................................................A23l 1/20
[58] Field of Search................................99/9, 98, 99, 64, 2; 260/123.5

[56] References Cited

UNITED STATES PATENTS

| 3,097,947 | 7/1963 | Kemmerer | 99/64 |
| 3,258,407 | 6/1966 | Blanchon | 99/9 |
| 3,284,212 | 11/1966 | Tribble et al. | 99/9 |

Primary Examiner—A. Louis Monacell
Assistant Examiner—Robert M. Elliott
Attorney—Curtis, Morris & Safford

[57] ABSTRACT

Soya meal is treated with a pectolytic enzyme alone or in combination with a cellulase or a cellulase and hemicellulase to give a soya product having a content of soluble reducible sugar increased to 10—25 percent by weight. An animal fodder combines 5–25 parts by weight of the treated product with 95–75 parts of powdered milk.

6 Claims, No Drawings

ENZYMATIC TREATMENT OF SOYA MEAL

ENZYMATIC TREATMENT OF SOYA MEAL

The present invention relates to a process for enzymatically treating soya meal, to treated soya meal, and to animal fodder comprising said treated soya meal.

Young animals, particularly young calves and pigs, are raised on powdered milk. It has already been attempted to replace a part of the powdered milk by more economical high-protein soya meal. However, these attempts have been unsuccessful: because of the poor tolerability of soya meal, it can replace at most 5 percent of the powdered milk. With higher quantities of soya meal serious digestive disturbances result, and finally nourishment is refused.

The enzymatic decomposition of soya meal is known in the art and is principally of value for increasing protein content or for decomposing the trypsin inhibitor which is viewed as the principal cause for lack of tolerability. However, these decomposition products, which are produced by treatment of soya meal with proteases such as pepsin, trypsin, papain, ficin, or pancreatin, as well as with fungal and bacterial proteases, are just as indigestible for young animals as untreated or simply roasted soya meal. Even treatment with these enzymes combined with amylase, taka-diastase, or cellulose does not overcome the intolerability of the soya meal, although the products are useful for other purposes such as food seasonings.

An enzymatic process for the decomposition of soya meal has now been found which produces easily digestible products. According to the invention, soya meal is treated in aqueous suspension with pectinases, optionally together with cellulases. Whereas untreated soya meal contains only about 1 percent of soluble reducible sugar, this fraction increases after enzymatic treatment, according to the amount of enzymes employed, up to 10 to 25 percent. Soya meal decomposed according to the process of the invention can replace from about 5 up to about 25 percent of the milk powder employed as fodder for young animals.

In addition to pectinases and the optional cellulases, hemicellulases such as xylanase or galactomannase, and proteases can also be employed to advantage. The fraction of soluble nitrogenous products can be more than doubled in this manner.

Pectinases and cellulases are contained in most plant cells in minor amounts which are not technically utilizable. Thus, the concentrated liquid or solid pectinase and cellulase preparations obtainable in commerce are derived from micro-organisms. For the process of the present invention, commercial products of this type having an activity of at least 150 PGU/mg. for the pectinases and of at least 150 cellulose activity units/mg. for the cellulase, are suitable. The cellulase employed should be active against native cellulose ($C_1$-activity). [One PGU is that quantity of a pectolytic enzyme which lowers the viscosity of a standard pectin solution containing 1 mg. of pectin by an amount $\Delta 1/\eta_{sp}=0.05$ in 40 minutes at 30° C. and at pH of 4.0. One cellulase unit is defined as that quantity of enzymes which decomposes a 1×1 centimeter piece of standardized filter paper (Toyo Roshi No. 51a, special) in 50 milliliters of a M/20-acetate buffer at pH 4.0 in a L-tube in 30 minutes, according to the method of Monod.]

Enzyme preparations of the concentrations mentioned are employed according to the invention in an amount of from 0.5 to 2 percent, by weight of dry soya flour. However, these amounts can be increased or decreased if the working temperature and the time of treatment are correspondingly altered.

The soya meal to be treated according to the invention, which if coarsely ground is characterized as soya groats, is subjected to the enzyme treatment in an aqueous suspension of the highest possible concentration. The pH value of the suspension is chosen to correspond to the optimum efficiency of the pectinase employed. This lies at somewhat different values according to the origin of the enzyme, but principally is in the region between pH 4 and 6.

The working temperature can be 20° C. Preferably, the process is carried out at 45°–55° C., while at 60° C. the enzyme is generally already inactivated. At an enzyme concentration of 1 percent, calculated on the weight of the soya meal, a treatment time of 5 hours at 50° C. is sufficient. Lower temperatures require higher amounts of enzyme or longer working times.

The suspension obtained can be combined directly with powdered milk and water and used as a fodder. In most cases, however, a storable and transportable dry product is prepared. For the preparation of such a product, spray drying, for example, is particularly suitable, but drum drying can also be employed.

A better understanding of the present invention and of its many advantages will be had by referring to the following specific example given by way of illustration.

EXAMPLE 1

A 40 percent aqueous suspension of soya meal was combined with 1 percent, calculated on the weight of the soya meal, of an enzyme preparation that had a pectinase activity of 450 PGU/mg. and a cellulose activity (active against native cellulose) of 500 cellulose units/mg. The suspension was warmed to 50° C., stirred for 5 hours, and after boiling for a short time in spray-drying apparatus was converted to a powdered solid product. The content of soluble sugars in the product was 22 percent by weight, compared with 0.77 percent in the starting material.

Twenty-five parts by weight of the product obtained were combined with 75 parts by weight of powdered skim milk, to provide an animal feed suitable for calves. This feed is tolerated without any side effects.

EXAMPLE 2

A 40 percent aqueous suspension of soya meal was treated with 1 percent, by weight of soya meal, of an enzyme preparation having a pectinase activity of 450 PGU/mg. and commercially available under the trade name "Pectinol Type 2197." The suspension was warmed to 50° C., stirred 5 hours, and converted to a solid powdered product after a short period of boiling in spray-drying apparatus. The content of soluble reducing sugar was 18.3 percent by weight in comparison with 0.77 percent in the starting material.

EXAMPLE 3

A 25 percent aqueous suspension of soya meal was treated with 1 percent, by weight of the soya meal, of an enzyme preparation having a pectinase activity of 350 PGU/mg. and 0.5 percent of a cellulose preparation, active against native cellulose, having 500 cellulose units/mg. The suspension was warmed to 50° C., stirred for 5 hours, and after a short period of boiling in spray-drying apparatus, was converted to a solid powdered product. The product content of soluble reducing sugars was 22.7 percent by weight, compared with 0.85 percent by weight in the starting material.

EXAMPLE 4

A 40 percent aqueous suspension of soya meal was treated with 1 percent, by weight of the soya meal, of a hemicellulase preparation having a pectinase activity of 400 PGU/mg. The preparation additionally contained not-yet standardized enzymatic substances such as xylanase, galactomannase, and amylase. Additionally, 0.5 percent of a cellulase preparation, active against native cellulose, having 2,500 cellulase units/mg. was added thereto. The suspension was warmed to 50° C., stirred for 5 hours, and after a short period of boiling in spray-drying apparatus was converted to a powdered solid product. The content of soluble reducing sugars in the product was 24.4 percent by weight, compared to 0.80 percent by weight in the starting material.

EXAMPLE 5

A 40 percent aqueous solution of soya meal was treated with 1 percent, by weight of the soya meal, of a mixture of a pectinase preparation having 450 PGU/mg. and a cellulase preparation, active against native cellulase, having 500 cellulase units/mg. Additionally, 1.5 percent of a mold fungus proteinase preparation having an activity of 400 PGU/mg. were admixed. The suspension was warmed to 50° C., stirred for 5 hours, and after boiling for a short period in spray-drying apparatus was converted to a solid powdered product. The product content of soluble reducing sugars was 22.2 percent by weight, compared with 0.95 percent by weight of the starting material, and 17.5 percent by weight of amino acids (calculated as leucine), in contrast with 1.4 percent in the starting material.

[One PU corresponds to that amount of enzyme which catalyzes the liberation from casein of trichloroacetic acid-soluble fragments equivalent to 1 g. of tyrosine per minute at 30° C. under standard conditions. The definition is that of B. Hagihara et al., Journal of Biochemistry, Tokyo, 45, 251 (1958).]

What is claimed is:

1. A process for preparing a dry soya meal animal fodder of improved tolerability, which process comprises treating an aqueous suspension of soya meal with a pectinase, and then removing water from said suspension to leave the desired dry product.

2. A process as in claim 1, wherein said pectinase is combined with a cellulase active against native cellulose.

3. A process as in claim 2 wherein said pectinase also is combined with a hemicellulase.

4. An enzymatically modified soya meal prepared according to the process of claim 1.

5. An enzymatically modified soya meal as in claim 4 having a content of soluble reducing sugar between 10 and 25 percent by weight.

6. An animal fodder comprising 5 to 25 percent of an enzymatically modified soya meal prepared according to the process of claim 1, together with 75 to 95 percent by weight of powdered milk.

* * * * *